Figure 1:
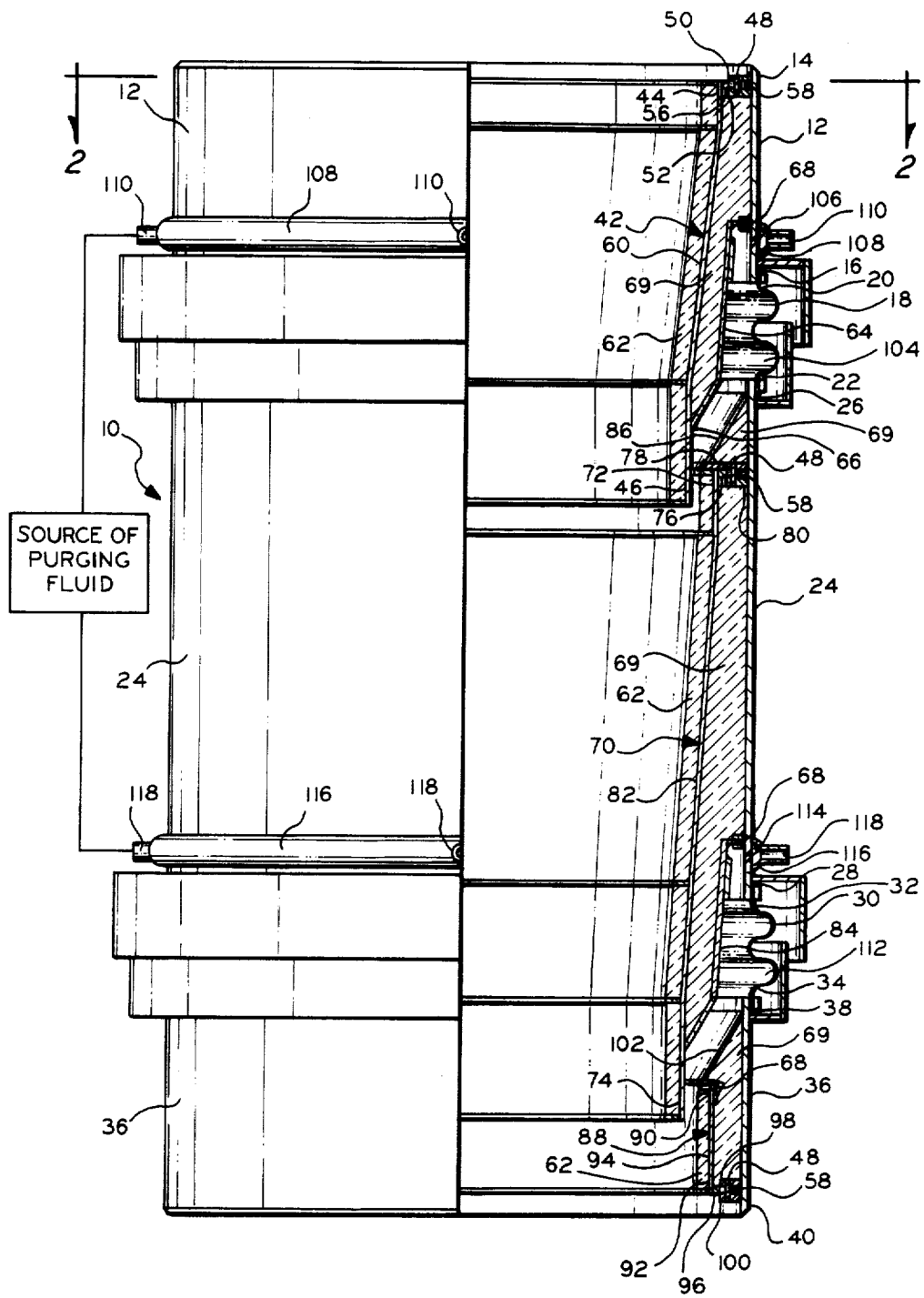

United States Patent [19]

Brock

[11] Patent Number: 4,685,703

[45] Date of Patent: Aug. 11, 1987

[54] EXPANSIBLE AND CONTRACTIBLE DUCT

[75] Inventor: Timothy A. Brock, Watauga, Tex.

[73] Assignee: Phillips Petroleum Company, Bartlesville, Okla.

[21] Appl. No.: 868,364

[22] Filed: May 27, 1986

[51] Int. Cl.[4] ............................................. F16L 27/12
[52] U.S. Cl. ...................................... 285/47; 285/300; 285/299; 285/227; 285/905; 266/270; 266/285; 110/182.5; 122/6.5
[58] Field of Search ..................... 285/47, 48, 49, 121, 285/924, 300, 299, 227, 187, 114, 905, 165; 110/182.5; 122/6.5, 6.6; 266/186, 285, 270; 208/349

[56] References Cited

U.S. PATENT DOCUMENTS

| 2,337,038 | 12/1943 | Fentress | 285/300 |
|---|---|---|---|
| 2,406,234 | 8/1946 | Marancik | 285/299 |
| 2,418,800 | 4/1947 | Wilson | 285/114 |
| 2,506,293 | 5/1950 | Copeland | 285/299 |
| 2,544,746 | 4/1951 | Cook | 285/300 |
| 2,840,180 | 6/1958 | Nobles | 285/49 |
| 3,488,067 | 1/1970 | Sommer | 285/47 |
| 3,662,696 | 5/1972 | Mahr et al. | 110/182.5 |
| 3,705,734 | 12/1972 | Rajakovics | 285/47 |
| 3,878,868 | 4/1975 | Wheeler | 285/300 |
| 3,885,595 | 5/1973 | Gibson | 285/47 |
| 3,899,197 | 8/1975 | Coenders | 285/227 |
| 3,901,539 | 8/1975 | Ijzerman | 285/227 |
| 3,980,286 | 9/1976 | Mahr et al. | 266/270 |
| 3,997,194 | 12/1976 | Eifer | 285/53 |
| 4,023,782 | 5/1977 | Eifer | 266/186 |
| 4,023,832 | 5/1977 | Legille et al. | 285/41 |
| 4,027,605 | 6/1977 | Legille | 110/182.5 |
| 4,045,056 | 8/1977 | Kandakov et al. | 285/41 |
| 4,060,263 | 11/1977 | Kotcharian | 285/47 |
| 4,063,755 | 12/1977 | Merz | 285/53 |
| 4,173,923 | 11/1979 | Snook | 98/58 |
| 4,212,253 | 7/1980 | Voituriez | 122/6.6 |
| 4,245,568 | 1/1981 | Grieco | 110/147 |
| 4,246,959 | 1/1981 | Bryne | 165/83 |
| 4,299,414 | 11/1981 | Bachmann | 285/187 |
| 4,576,404 | 3/1986 | Weber | 285/227 |

FOREIGN PATENT DOCUMENTS

| 632354 | 5/1963 | Belgium | 285/114 |
|---|---|---|---|
| 1007933 | 5/1957 | Fed. Rep. of Germany | 110/182.5 |

Primary Examiner—Cornelius J. Husar
Assistant Examiner—Eric K. Nicholson
Attorney, Agent, or Firm—French & Doescher

[57] ABSTRACT

A longitudinally expansible and contractible duct characterized by the employment of a pair of expansible and contractible bellows protected by internal, thermally insulated, baffles which are slidably secured to the external shell members of the duct to accommodate differential thermal expansion both longitudinally and radially of the duct.

13 Claims, 2 Drawing Figures

EXPANSIBLE AND CONTRACTIBLE DUCT

The present invention is generally directed to longitudinally expansible and contractible duct structures. More particularly, but not by way of limitation, the present invention is directed to a longitudinally expansible and contractible duct structure suitable for use as a flue gas duct.

In the handling of hot gases such as hot flue gases, it is usually necessary to pass such gases through ducts constructed to withstand the operating temperatures of the gases and to accommodate thermal expansion and contraction of the duct resulting from changes in temperature of the gases being directed therethrough. For example, in the handling of flue gases from the regenerator of a fluid catalytic cracking (FCC) regenerator it is commonplace to expose the interior of the duct to temperatures in the neighborhood of 1400° F. (760° C.) while the external shell of the duct can be commonly exposed to simultaneous temperatures in the range from about 200° F. to about 300° F. (93° C. to 149° C.). It is also common for such ducts to be constructed with internal sleeves or baffles constructed of a suitable stainless steel alloy while the external shell of the duct is constructed of carbon steel, with the two steels exhibiting substantially different coefficients of thermal expansion.

In order to accommodate longitudinal expansion and contraction of such ducts under normal operating conditions as well as startup and shutdown conditions, it is often desirable to provide such ducts with one or more expansion joints. It has been found, however, that in expansion joint constructions wherein the expansion joint liner is fixedly secured as by welding to the expansion joint external shell that relative expansion and contraction between the liner and the external shell often results in permanent damage to the expansion joint necessitating removal and replacement of such expansion joints at unacceptably short intervals resulting in premature plant shutdowns to accommodate such repairs to and/or replacement of the damaged expansion joint.

It would, therefore, be extremely advantageous to provide an expansible and contractible duct or joint which is capable of accommodating both longitudinal and transverse thermal expansion and contraction without damage thereto. Accordingly, the present invention contemplates a longitudinally expansible and contractible duct which comprises a first hollow duct member having a longitudinal axis and first and second opposite end portions, first hollow bellows means having a longitudinal axis and first and second opposite end portions with the first end portion thereof being secured in fluid flow communication to the second end portion of said first hollow duct member, a second hollow duct member having a longitudinal axis and first and second opposite end portions with the first end portion thereof being secured in fluid flow communication to the second end portion of the first hollow bellows means, second hollow bellows means having a longitudinal axis and first and second opposite end portions with the first end portion thereof being secured in fluid flow communication to the second end portion of the second hollow duct member, a third hollow duct member having a longitudinal axis and first and second opposite end portions with the first end portion thereof being secured in fluid flow communication to the second end portion of the second hollow bellows means, first hollow baffle means having a longitudinal axis and first and second opposite end portions and being at least partially disposed within the first hollow duct member with the first end portion of the first hollow baffle means being movably secured to the first hollow duct member intermediate the first and second end portions of the first hollow duct member and with the second end portion of the first hollow baffle means being positioned within the second hollow duct member, and second hollow baffle means having a longitudinal axis and first and second opposite end portions and being at least partially disposed within the second hollow duct member with the first end portion of the second hollow baffle means being movably secured to the second hollow duct member intermediate the first and second end portions of the second hollow duct member and with the second end portion of the second hollow baffle means being positioned within the third hollow duct member.

An object of the invention is to increase the efficiency of operation of expansible and contractible ducts.

Another object of the invention is to increase the reliability of expansible and contractible ducts.

A further object of the invention is to increase the operating life of expansible and contractible ducts which are exposed to extremely high temperatures.

A still further object of the invention is to provide a longitudinally expansible and contractible duct which is economical in construction and operation.

Figure 2:
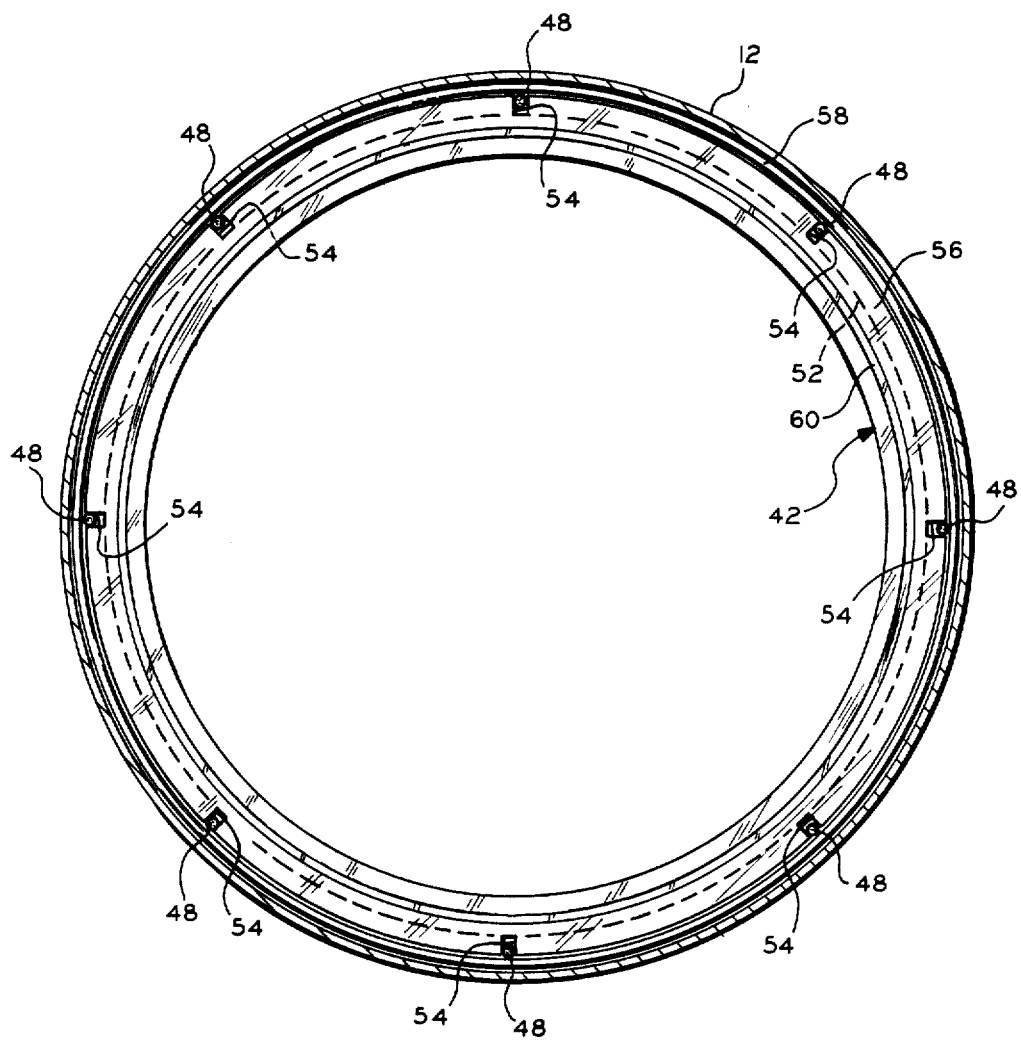

Other objects, aspects and advantages of the invention will be evident from the following detailed description when read in conjunction with the accompanying drawings in which:

FIG. 1 is a partial vertical cross-sectional view of a longitudinally expansible and contractible duct constructed in accordance the present invention; and FIG. 2 is a cross-sectional view taken along lines 2—2 of FIG. 1 illustrating typical means for securing hollow baffle means or liners within the external shell of a duct constructed in accordance with the present invention.

Referring now to the drawings, a longitudinally expansible and contractible duct is illustrated therein and is generally designated by the reference character 10. The duct 10 comprises a first hollow external duct member 12 having a first end portion 14 and a second end portion 16 and a longitudinal axis, and first hollow bellows 18 having a first end portion 20 and a second end portion 22 with the first end portion 20 fixedly secured by a suitable means such as welding to the second end portion 16 of the first duct member 12. A second hollow external duct member 24 having a first end portion 26 and a second end portion 28 is fixedly secured at the first end portion thereof to the second end portion 22 of the first hollow bellows 18 by suitable means such as welding. A second hollow bellows 30 having a first end portion 32 and a second end portion 34 is fixedly secured at the first end portion 32 thereof to the second end portion 28 of the second duct member 24 by suitable means such as welding. A third hollow external duct member 36 having a first end portion 38 and a second end portion 40 is fixedly secured at the first end portion 38 thereof to the second end portion 34 of the second bellows 30 by suitable means such as welding. All suitable connections between the first, second and third duct members 12, 24 and 36 and the first and second bellows 18 and 30 are fluid-tight connections providing fluid flow communication between adjacent duct members and bellows. Each of the duct members and bellows has a longitudinal axis, and these longitudinal axes are substantially coaxial throughout the full length of the duct 10.

The duct 10 is further provided with first hollow baffle means in the form of a first liner assembly 42. The liner assembly 42 has a longitudinal axis substantially coaxial with the longitudinal axis of the first duct member 12 and has a first end portion 44 and a second end portion 46. The first end portion 44 of the liner assembly 42 is slidably secured to the interior of the first end portion 14 of the first duct member 12 by means of a plurality of longitudinally aligned guide pins 48 mounted in a pair of longitudinally spaced apart, radially inwardly extending annular ribs 50 and 52 mounted on the interior of the first end portion 14 of the first duct member 12, which pins 48 are slidably received in a corresponding plurality of transversely or radially extending slots 54 formed in a radially outwardly extending rib 56 fixedly secured to the first end portion 44 of the liner assembly 42 with the rib 56 interposed between the ribs 50 and 52. It will be seen that this mounting arrangement involving the guide pins 48, slots 54 and ribs 50, 52 and 56 permits relative movement between the first duct member 12 and the liner assembly 42 in a direction transverse to the longitudinal axis of the duct while restricting any relative longitudinal movement between the first end portion 14 of the first duct member 12 and the first end portion 44 of the liner assembly 42. A suitable annular seal is provided between the circumferential outer surface of the rib 56, the ribs 50 and 52 and the inner surface of the first end portion 14 of the first duct member 12 by means of an annular seal member 58 made of a suitable material capable of withstanding the high temperatures imposed upon the duct 10. Suitable material for the annular seal member 58 includes alumina-silica fiber square braid rope.

The first liner assembly 42 further includes a hollow inner liner or baffle 60 which is fixedly secured to and extends downwardly from the rib 56. The inner surface of the inner liner 60 is preferably protected by refractory material 62 which is fixedly secured thereto. The first liner assembly 42 additionally includes a tubular shaped member 64 which is secured at its lower end to the lower end portion of the outer surface of the inner liner 60 as shown at 66, and extends upwardly therefrom to the inner surface of the first duct member 12 where sliding sealing contact is made with the first duct member 12 by means of a suitable annular seal 68 carried by the first liner 42 and preferably constructed of the same material as employed in the construction of the annular seal member 58. The volume defined by the inner surface of the first duct member 12, the inner liner 60 and the generally tubular shaped member 64 is preferably filled with a suitable heat insulation material such as alumina-silica fiber blanket or bulk materials as shown at 69.

Second hollow baffle means in the form of a second liner assembly 70 having a first end portion 72 and a second end portion 74 is secured at the first end portion 72 thereof to the first end portion 26 of the second duct member 24 in the same manner as described above for the securement of the first liner assembly 42 to the first duct member 12. The second liner assembly 70 is provided with a radially outwardly extending annular rib 76 which is provided with a plurality of radially extending slots which are slidingly received about corresponding longitudinally oriented guide pins 48 mounted on radially inwardly extending annular ribs 78 and 80 mounted on the inner surface of the second duct member 24. An annular seal member 58, as described above, provides sealing engagement among the annular ribs 76, 78 and 80 and the inner surface of the second duct member 24. The second liner assembly 70 further includes a hollow inner liner or baffle 82 which is fixedly secured to and extends downwardly from the annular rib 76 into the interior of the third duct member 36. The inner surface of the inner liner or baffle 82 is also preferably provided with refractory material 62 as described above. The second liner assembly 70 further includes a generally tubular shaped member 84 which is fixedly secured to and extends upwardly from the lower end portion of the inner liner or baffle 82 to a sliding sealing connection with the inner surface of the second duct member 24 by means of a suitable annular seal 68 mounted on the tubular shaped member 84 as described above. As also described above, suitable heat insulation material 69 is preferably disposed within the cavity defined by the inner surface of the second duct member 24, the inner liner or baffle 82 and the generally tubular shaped member 84. The second liner assembly 70 is further characterized to include a generally tubular shaped member 86 which extends downwardly and inwardly from the inner surface of the first end portion 26 of the second duct member 24 to the upper surface of the annular rib 78 and preferably further includes a quantity of heat insulation material 69 within the cavity defined by the member 86, the inner surface of the second duct member 24 and the upper surface of the annular rib 78.

The duct 10 further includes third hollow baffle means in the form of a third liner assembly 88 disposed within the third duct member 36. The liner assembly 88 has a first end portion 90 and a second end portion 92. The liner assembly 88 includes a hollow inner liner or baffle 94 which is secured at the lower end thereof by means of a radially outwardly extending annular rib 96 fixedly secured thereto which is provided with a plurality of radially outwardly extending slots therein in the same manner as described above for the rib 56. The slots in the annular rib 96 are received about respective longitudinally aligned guide pins 48 mounted in radially inwardly extending annular ribs 98 and 100 which are fixedly secured to the inner surface of the second end portion 40 of the third duct member 36. The inner liner or baffle 94 extends upwardly from the annular rib 96 and terminates in sliding sealing engagement by means of a suitable annular seal member 68 as described above with the lower end portion of a generally tubular shaped member 102 which extends downwardly and inwardly from its rigid securement to the inner surface of the first end portion 38 of the third duct member 36. The annular cavity defined by the inner surface of the third duct member 36, the generally tubular shaped member 102 and the hollow inner liner 94 is preferably filled with suitable heat insulation material 69 as described above. The inner surface of the inner liner or baffle 94 is preferably protected by the above-described refractory material 62 which is suitable fixedly secured thereto.

The first duct member 24, first hollow bellows 18, second duct member 24, first liner assembly 42 and second liner assembly 70 define a first annular chamber 104 therebetween. The first duct member 12 is provided with a plurality of ports or passages 106 which communicate between the exterior of the first duct member 12 and the first annular chamber 104. An annular manifold 108 is mounted on the exterior of the first duct member 12 and covers the ports 106. The manifold 108 is provided with a plurality of inlets 110 which provide means for connection between the manifold 108 and an external source of purging fluid, which fluid can be advantageously directed through the inlets 110, manifold 108 and ports 106 to purge any undesirable solids or other constituents of the fluids passing through the duct 10 which might otherwise enter the first annular chamber 104 to the detriment of the operation of the bellows 18.

In a similar manner, the second duct member 24, second bellows 30, third duct member 36, second liner assembly 70 and third liner assembly 88 define a second annular chamber 112 therebetween. The second duct member 24 is provided with a plurality of ports or passages 114 which communicate between the second annular chamber 112 and the exterior of the second duct member 24. An annular manifold 116 is mounted on the exterior of the second duct member 24 and covers the ports or passages 114. The annular manifold is provided with a plurality of inlets 118 which provide means for connecting the manifold 116 to a source of purging fluid external to the duct 10. In the same manner as described above, the inlets 118, annular manifold 116 and ports or passages 114 provide means for introducing purging fluid from the external source of purging fluid into the second annular chamber 112 to purge foreign particles or contaminants therefrom which might otherwise foul or otherwise adversely affect the operation of the second bellows 30.

From the foregoing description of a preferred embodiment of the present invention, it will be seen that the duct 10 is provided with features which clearly overcome the above-discussed deficiencies of prior expansible and contractible ducts and clearly meets the objects of the present invention recited above.

Changes may be made in the combination and arrangement of parts or elements as heretofore set forth in the specification and shown in the drawings without departing from the spirit and scope of the invention as defined in the following claims.

I claim:

1. A longitudinally expansible and contractible duct, comprising:
   a first hollow duct member having a longitudinal axis and first and second opposite end portions;
   first hollow bellows means having a longitudinal axis and first and second opposite end portions with the first end portion thereof being secured in fluid flow communication to the second end portion of said first hollow duct member;
   a second hollow duct member having a longitudinal axis and first and second opposite end portions with the first end portion thereof being secured in fluid flow communication to the second end portion of said first hollow bellows means;
   second hollow bellows means having a longitudinal axis and first and second opposite end portions with the first end portion thereof being secured in fluid flow communication to the second end portion of said second hollow duct member;
   a third hollow duct member having a longitudinal axis and first and second opposite end portions with the first end portion thereof being secured in fluid flow communication to the second end portion of said second hollow bellows means;
   first hollow baffle means having a longitudinal axis and first and second opposite end portions and being at least partially disposed within said first hollow duct member with the first end portion of said first hollow baffle means being movably secured to said first hollow duct member intermediate the first and second end portions of said first hollow duct member so as to permit only limited relative movement between said first hollow baffle means and said first hollow duct member in a direction transverse to the longitudinal axis of said first hollow duct member and with the second end portion of said first hollow baffle means being positioned within said second hollow duct member; and
   second hollow baffle means having a longitudinal axis and first and second opposite end portions and being at least partially disposed within said second hollow duct member with the first end portion of said second hollow baffle means being movably secured to said second hollow duct member intermediate the first and second end portions of said second hollow duct member so as to permit only limited relative movement between said second hollow baffle means and said second hollow duct member in a direction transverse to the longitudinal axis of said first hollow duct member and with the second end portion of said second hollow baffle means being positioned within said third hollow duct member.

2. A duct in accordance with claim 1 wherein said first hollow duct member, said first hollow bellows means, said second hollow duct member, said first hollow baffle means and said second hollow baffle means define a first annular chamber therebetween, and wherein said second hollow duct member, said second hollow bellows means, said third hollow duct member and said second hollow baffle means define a second annular chamber therebetween.

3. A duct in accordance with claim 2 further comprising:
   first purging means in said first hollow duct member for providing fluid flow communication between said first annular chamber and a source of purging fluid external to said first hollow duct member for permitting purging fluid to flow from said source through said first annular chamber into said longitudinally expansible and contractible duct; and
   second purging means in said second hollow duct member for providing fluid flow communication between said second annular chamber and a source of purging fluid external to said second hollow duct member for permitting purging fluid to flow from said source through said second annular chamber into said longitudinally expansible and contractible duct.

4. A duct in accordance with claim 3 further comprising:
   first heat insulation means disposed between said first hollow duct member and at least a portion of said first hollow baffle means and second heat insulation means disposed between said second hollow duct member and at least a portion of said second hollow baffle means.

5. A duct in accordance with claim 4 further comprising heat insulation means disposed within and secured to said third hollow duct member.

6. A duct in accordance with claim 1 further comprising third hollow baffle means having a longitudinal axis and first and second opposite end portions and being at least partially disposed within said third hollow duct member with said third hollow baffle means being movably secured to said third hollow duct member intermediate the first and second end portions of said third hollow duct member; and wherein said first hollow duct member, said first hollow bellows means, said second hollow duct member, said first hollow baffle means and said second hollow baffle means define a first annular chamber therebetween; wherein said second hollow duct member, said second hollow bellows means, said third hollow duct member, said second hollow baffle means and said third hollow baffle means define a second annular chamber therebetween.

7. A duct in accordance with claim 6 further comprising first heat insulation means disposed between said first hollow duct member and at least a portion of said first hollow baffle means, second heat insulation means disposed between said second hollow duct member and at least a portion of said second hollow baffle means, and third insulation means disposed between said third hollow duct member and said third hollow baffle means.

8. A duct in accordance with claim 7 further comprising:
   first purging means in said first hollow duct member for providing fluid flow communication between said first annular chamber and a source of purging fluid external to said first hollow duct member for permitting purging fluid to flow from said source through said first annular chamber into said longitudinally expansible and contractible duct; and
   second purging means in said second hollow duct member for providing fluid flow communication between said second annular chamber and a source of purging fluid external to said second hollow duct member for permitting purging fluid to flow from said source through said second annular chamber into said longitudinally expansible and contractible duct.

9. A duct in accordance with claim 6 further comprising:
   first purging means in said first hollow duct member for providing fluid flow communication between said first annular chamber and a source of purging fluid external to said first hollow duct member for permitting purging fluid to flow from said source through said first annular chamber into said longitudinally expansible and contractible duct; and
   second purging means in said second hollow duct member for providing fluid flow communication between said second annular chamber and a source of purging fluid external to said second hollow duct member for permitting purging fluid to flow from said source through said second annular chamber into said longitudinally expansible and contractible duct.

10. A duct in accordance with claim 6 wherein:
   the first end portion of said first hollow baffle means is secured to said first hollow duct member by means of a plurality of longitudinally aligned pin means fixedly secured to said first hollow duct member and slidably received in a corresponding plurality of slot means in said first end portion of said first hollow baffle means, whereby said first hollow baffle means is at least partially free to move relative to said first hollow duct member in a direction transverse to the longitudinal axis of said first hollow duct member to accommodate differential thermal expansion and contraction between said first hollow duct member and said first hollow baffle means;
   the first end portion of said second hollow baffle means is secured to said second hollow duct member by means of a plurality of longitudinally aligned pin means fixedly secured to said second hollow duct member and slidably received in a corresponding plurality of slot means in the first end portion of said second hollow baffle means, whereby said second hollow baffle means is at least partially free to move relative to said second hollow duct member in a direction transverse to the longitudinal axis of said second hollow duct member to accommodate differential thermal expansion and contraction between said second hollow duct member and said second hollow baffle means; and
   the second end portion of said third hollow baffle means is secured to said third hollow duct member by means of a plurality of longitudinally aligned pins fixedly secured to said third hollow duct member and slidably received in a corresponding plurality of slot means in the second end portion of said third hollow baffle means, whereby said third hollow baffle means is at least partially free to move relative to said third hollow duct member in a direction transverse to the longitudinal axis of said third hollow duct member to accommodate differential thermal expansion and contraction between said third hollow duct member and said third hollow baffle means.

11. A duct in accordance with claim 6 wherein refractory material is secured to the inner surfaces of said first, second and third hollow baffle means.

12. A duct in accordance with claim 1 wherein:
   the first end portion of said hollow baffle means is secured to said first hollow duct member by means of a plurality of longitudinally aligned pin means fixedly secured to said first hollow duct member and slidably received in a corresponding plurality of slot means in said first end portion of said first hollow baffle means, whereby said first hollow baffle means is at least partially free to move relative to said first hollow duct member in a direction transverse to the longitudinal axis of said first hollow duct member to accommodate differential thermal expansion and contraction between said first hollow duct member and said first hollow baffle means; and
   the first end portion of said second hollow baffle means is secured to said second hollow duct member by means of a plurality of longitudinally aligned pin means fixedly secured to said second hollow duct member and slidably received in a corresponding plurality of slot means in the first end portion of said second hollow baffle means, whereby said second hollow baffle means is at least partially free to move relative to said second hollow duct member in a direction transverse to the longitudinal axis of said second hollow duct member to accommodate differential thermal expansion and contraction between said second hollow duct member and said second hollow baffle means.

13. A duct in accordance with claim 1 wherein refractory material is secured to the inner surfaces of said first and second hollow baffle means.

* * * * *

UNITED STATES PATENT AND TRADEMARK OFFICE
CERTIFICATE OF CORRECTION

PATENT NO. : 4,685,703

DATED : August 11, 1987

INVENTOR(S) : Timothy A. Brock

It is certified that error appears in the above-identified patent and that said Letters Patent is hereby corrected as shown below:

Column 8, line 37, after "said" and before "hollow", please insert ---first---.

Signed and Sealed this

Fourteenth Day of June, 1988

*Attest:*

DONALD J. QUIGG

*Attesting Officer*    *Commissioner of Patents and Trademarks*